United States Patent [19]

Grimsley

[11] 4,114,483

[45] Sep. 19, 1978

[54] PORTABLE BORING TOOL FOR BALL VALVES

[76] Inventor: Ernest E. Grimsley, 4533 Wake Forest Dr., Portsmouth, Va. 23703

[21] Appl. No.: 785,996

[22] Filed: Apr. 8, 1977

[51] Int. Cl.² .............................................. B23B 41/00
[52] U.S. Cl. .................................. 82/1.2; 51/241 VS; 408/101; 408/102; 408/129
[58] Field of Search .................. 82/1.4, 1.2, 2 E, 4 C; 90/12.5, DIG. 11; 51/241 VS, 241 A; 408/99–102, 115 R, 125, 129

[56] References Cited

U.S. PATENT DOCUMENTS

| | | | |
|---|---|---|---|
| 801,350 | 10/1905 | Williams | 51/241 VS |
| 1,099,215 | 6/1914 | Sullivan | 82/4 C |
| 2,318,854 | 5/1943 | Hall | 51/241 A |
| 3,216,295 | 11/1965 | Gill | 82/4 C |

*Primary Examiner*—Leonidas Vlachos
*Attorney, Agent, or Firm*—Griffin, Branigan and Butler

[57] ABSTRACT

A portable boring tool for refinishing the seal ring seats on ball valves is provided with a base plate which is mounted on top of the valve. A housing is supported by the base plate in a manner that permits linear movement of the housing. The housing contains gearing for transmitting motion from an input shaft above the base plate to a cutter assembly drive shaft below the base plate. The cutter assembly drive shaft rotates an automatically indexing cutter head assembly to cut successively smaller circles of material from the surface being refinished. A handwheel and feed screw arrangement is provided for moving the housing and cutter head assembly along a linear path. A micrometer is provided for limiting the depth of cut to be taken into the surface being refinished.

13 Claims, 8 Drawing Figures

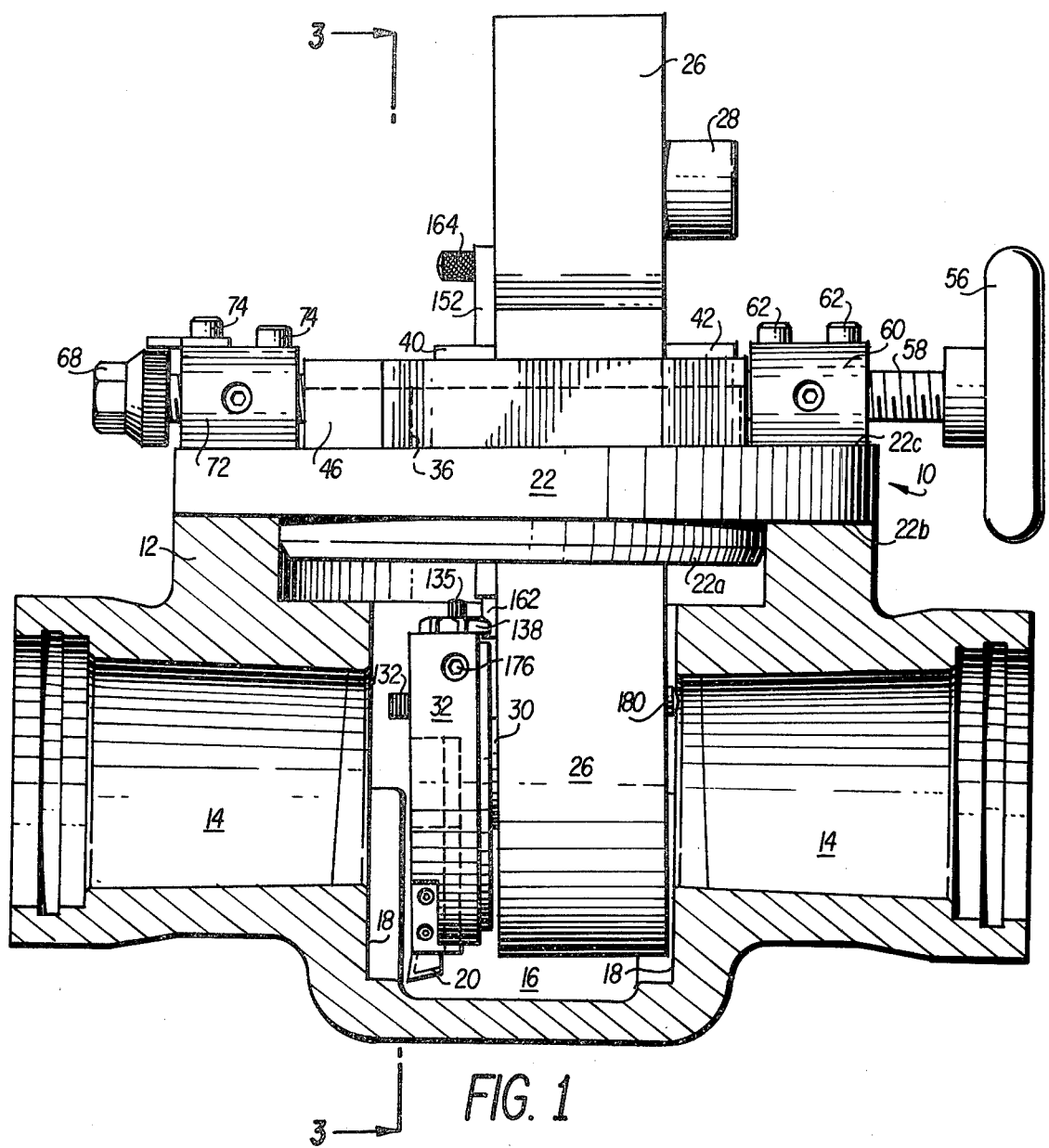
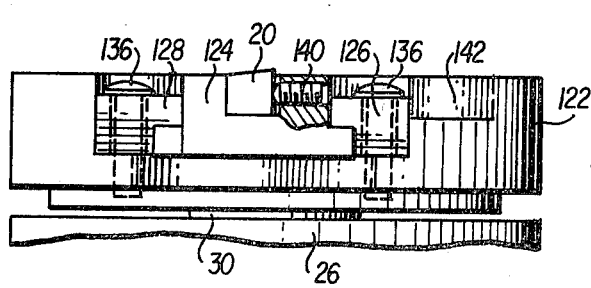
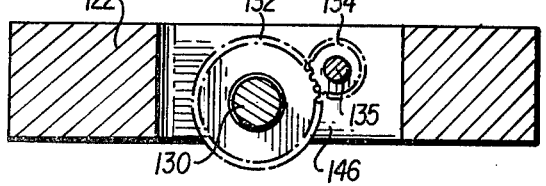

PORTABLE BORING TOOL FOR BALL VALVES

BACKGROUND OF THE INVENTION

Ball valves, particularly those used in controlling the flow of high pressure water or other materials often develop leaks between the seal rings and the valve body surfaces against the seal rings seat. These leaks become progressively worse due to the corrosive action of the material flowing through the valve or the cutting action of water under high pressure. In the past there has been no method of refinishing the seal ring seating surfaces of ball valves without removing them from the fluid lines they are controlling. The valves are frequently in rather cramped spaces, particularly aboard naval vessels. There are no tools presently available for reboring and/or refacing ball valves in line. Thus, it has been customary in the past to remove ball valves from the lines, transport them to a remote location where they are refinished then return them to their initial site for reinstallation. This procedure is both time consuming and costly.

Another factor contributing to the difficulty of refinishing ball valve seal ring seats in situ has been the fact that the seating surfaces to be refinished lie in planes which are not normal to the top surface of the valve housing, but are instead inclined approximately one degree, plus or minus fifteen minutes, with respect to the normal.

BRIEF DESCRIPTION OF THE INVENTION

An object of the present invention is to provide a simple and lightweight portable boring tool for refinishing the seal ring seat surfaces of ball valves.

A further object of the invention is to provide a portable boring tool capable of refinishing the seal ring seat surfaces of ball valves in situ.

A further object of the invention is to provide a boring tool having a base plate adapted for mounting on the top of the ball valve housing, a housing supported for linear movement on the base plate and having means therein for transmitting motion from an input shaft above the base plate to an output shaft located below the base plate, a cutter head assembly mounted on the output shaft and carrying a tool bit for cutting a seal ring seating surface, and means for moving the tool housing along a linear path to thereby move the tool bit toward or away from the seal ring seating surface.

An object of the present invention is to provide a boring tool as described above wherein the cutter head assembly includes means for moving the tool bit inwardly toward its axis of rotation on each revolution of the cutter head assembly whereby the tool bit travels in succcessively smaller circles on each revolution.

A further object of the invention is to provide a boring tool as described above wherein the means for moving the tool bit inwardly toward its axis of rotation comprises a cutter head body, a tool block slidably mounted on the body and having the tool bit attached thereto, a thread shaft attached to the slidable block, and means for axially moving the threaded shaft a small increment on each rotation of the cutter head assembly.

A further object of the invention is to provide a boring tool as described above wherein the means for axially moving the threaded shaft comprises an internally threaded gear retained by the cutter body, and means engaging an element on the housing once each revolution of the cutter head assembly for rotating the gear a fraction of one revolution, the threaded shaft passing through the gear and being drawn therethrough as the gear is rotated.

Other objects of the invention and its mode of operation will become apparent upon consideration of the following description and the accompanying drawings.

BRIEF DESCRIPTION OF THE DRAWINGS

FIG. 1 is a front view of a portable boring tool mounted on top of a ball valve housing which is shown in section;

FIG. 6 is a sectional view of the cutter head assembly taken along the line 6—6 of FIG. 3;

DESCRIPTION OF A PREFERRED EMBODIMENT

Figure 2:
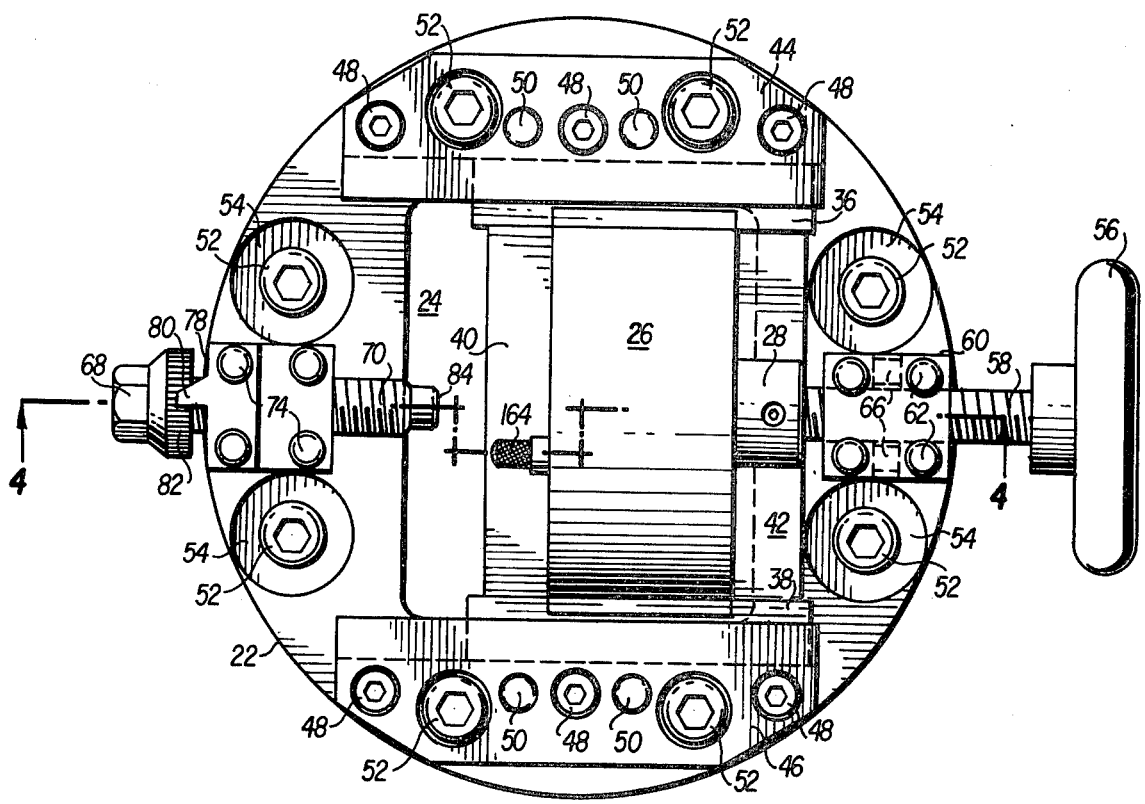
FIG. 2 is a top view of FIG. 1 showing the boring tool.

FIG. 1 shows a portable boring tool 10 mounted in the position of use on top of the housing 12 of a conventional ball valve. The housing has inlet and outlet openings 14 and a chamber 16. Normally, chamber 16 contains the ball or movable valving element together with an upwardly-extending stem which extends upwardly through a top cover to a handle or wheel. The top cover and the ball element and its operating mechanism are all removed before the boring tool is placed in position on the housing 12. In addition, the chamber 16 normally contains two seal rings which are seated against surfaces 18 of the chamber 16 and form a seal against the ball element. These seals are also removed before the boring tool is mounted on the housing 12.

During normal use of the ball valve, the surfaces 18 may become corroded. In addition, high pressure water leaks may cut the surfaces 18, thus causing leakage between the housing 12 and the seal rings. Thus, it becomes necessary to periodically clean the surfaces 18, possibly add weld material to build up the surfaces 18 and then refinish the surfaces so that they will form a tight seal with the seal rings. The boring tool 10 performs the refinishing step by cutting the surfaces 18 with a tool bit 20.

The boring tool 10 has a base plate 22 which is generally circular in shape (FIG. 2) and has a downwardly-extending portion 22a which is also circular in shape. The diameter of the portion 22a is chosen such that when the base plate 22 is positioned on top of the valve housing 12, the portion 22a will snugly fit into the top opening of the valve housing so as to properly position the boring tool 10. The annular lower surface 22b of the base plate is planar and rests on the planar upper surface of housing 12. The supper surface 22c of the base plate is also planar but is inclined with respect to the surface 22b for reasons which are subsequently explained.

A generally rectangular opening 24 (FIG. 2) extends entirely through base plate 22 and its downwardly extending portion 22a. As shown in FIG. 1, a support means or housing 26 extends through the opening 24 and downwardly into the valve chamber 16. A drive power input shaft 28 extends through one side of housing 26 at a point above the base plate 22. A cutter assembly drive shaft 30 extends through one side of housing 26 below base plate 22 and an automatic indexing cutter head assembly 32 is attached to the shaft 30.

The housing 26 comprises two mating halves 26a and 26b (FIG. 5) which are held together by a plurality of screws 34. In addition, the housing 26 is surrounded by four elongated metal members including two slide members 36 and 38 (FIG. 2), a stop bar 40 and a tie bar 42. For the sake of clarity, the screws and dowels connecting members 36, 38, 40 and 42 to each other and to the housing 26 are not shown in the drawing. However, it might be noted that each of the members 36 and 38 has three countersunk holes and screws passing through these holes enter threaded holes in housing part 26b, stop bar 40 and tie bar 42. In addition, each of the members 36 and 38 is provided with two locating pins or dowels extending into the two parts 26a and 26b of the housing. The stop bar 40 and the tie bar 42 are each affixed to the housing 26 by a plurality of screws.

Figures 3, 5, 7:
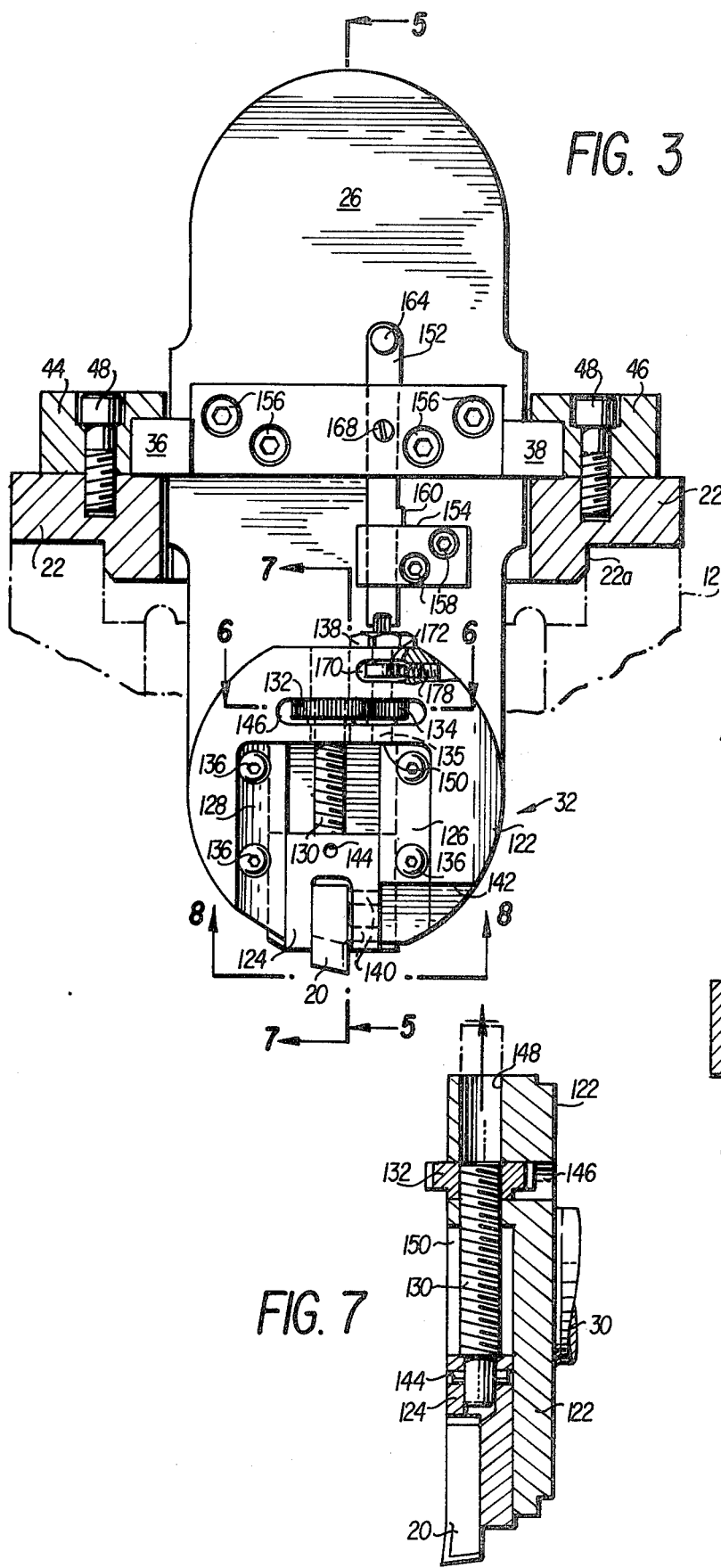
FIG. 3 is a sectional view taken along the line 3—3 of FIG. 1.
FIG. 5 is a sectional view of the gear housing taken along the line 5—5 of FIG. 3.
FIG. 7 is a sectional view of the cutter head assembly taken along the line 7—7 of FIG. 3; and, FIG. 8 is a part sectional view showing details of the cutter head assembly and taken along the line 8—8 of FIG. 3.

The housing 26 and all of the elements attached thereto are movable from side to side as viewed in FIG. 2. Two gib guides 44 and 46 are provided to permit this movement while still retaining the housing 26 on the base plate 22. As best shown in FIG. 3, the gib guides 44 and 46 are undercut to provide inwardly extending portions which overhang the gibs 36 and 38. The gibs 36 and 38 rest on the base plate 22 and slide thereon. Gib guides 44 and 46 prevent the gibs from moving upwardly or to the side as viewed in FIG. 3. The gib guides 44 and 46 are firmly affixed to base plate 22 by a plurality of screws 48. In addition, two dowels 50 extend through each of the gib guides 46 and 48 and into the base plate 22 to properly locate the gib guides so that they will not bind and prevent movement of the gibs 36 and 38.

The base plate 22 is provided with a plurality of holes 52 equidistantly spaced around its periphery. These holes extend completely through the base plate and aligned holes are provided in the gib guides 44 and 46. The purpose of the holes 52 is to attach the boring tool 10 to the valve housing 12 by bolting the base plate 22 to the top of the housing. A conventional valve housing 12 has upwardly extending threaded studs for holding the cover thereon. These studs extend through holes 52 and nuts are tightened thereon to hold the boring tool on the housing. Should a valve housing have threaded holes in the top thereof for receiving bolts that hold the valve cover, then bolts can be inserted downwardly through holes 52 and tightened to hold the cutting tool on the housing. As viewed in FIG. 2, the top surface of base plate 22 surrounding the four holes 52 closest to the horizontal center line of base plate is cut as illustrated at 54 so as to be parallel with the bottom surface 22b. This enables nuts placed on the studs to be tightened flat against a portion of the upper base plate surface although this surface is not, generally speaking, parallel to the top surface of the valve housing. The boring tool may be held firmly in place merely by tightening nuts onto these four studs.

Figure 4:
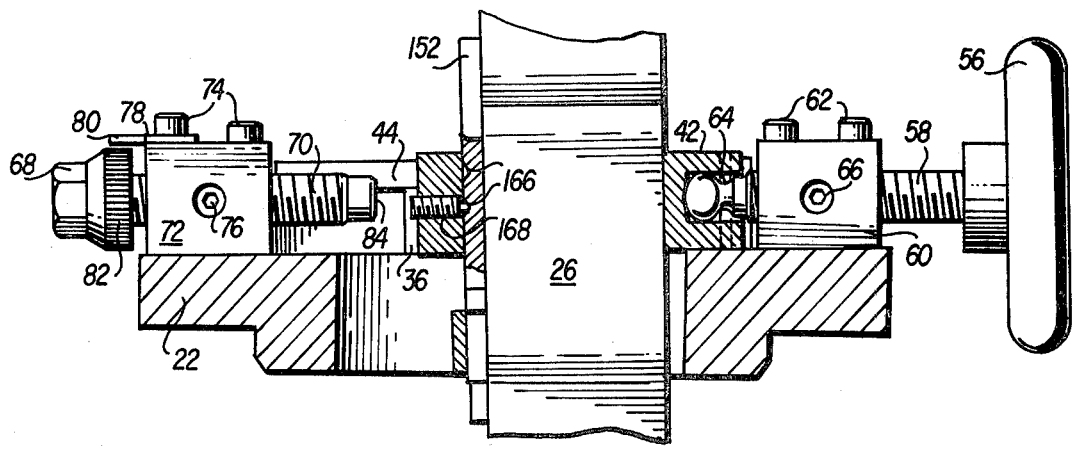
FIG. 4 is a part sectional view taken along the line 4—4 of FIG. 2.

The sliding movement of housing 26 is accomplished by rotating a handwheel 56. The handwheel is attached to a threaded shaft 58 which extends through a threaded hole in a mounting block 60. Block 60 is attached to the upper surface of base plate 22 by four screws 62. As shown in FIG. 4, the end of shaft 58 opposite handle 56 is not threaded but is provided with a ball-like portion connected to the threaded portion by a region of reduced cross section. The ball-like portion and the region of reduced cross section extend into an opening in the side of tie bar 42. A fastening pin 64 extends downwardly through the tie bar 42 and beside the shaft 58 at the region of reduced cross section. Thus, the pin 64 permits the shaft 58 to be rotated but prevents the ball-like end portion from being pulled out of the tie bar 42. As the handwheel 56 is rotated in one direction, the threads in block 60 pull the shaft 58 to the left and the ball-like portion of the shaft pushes against tie bar 42, thus moving the housing 26 to the left. When the handwheel 56 is rotated in the opposite direction, the threads in block 60 cause the shaft 58 to move to the right and the ball-like portion of the shaft acts against pin 64 to pull tie bar 42 and housing 26 to the right. The block 60 is provided with two holes on opposite sides thereof for receiving two set screws 66. Preferably, these screws have nylon noses to prevent marring of the threads on the shaft 58. The set screws 66 are tightened to prevent rotational "slippage" of the shaft 58.

Since the tool bit 20 is carried with the housing 26, the depth of cut made by the tool bit may be gauged or limited by limiting the horizontal movement of the housing. A micrometer arrangement is provided for this purpose. In FIGS. 2 and 4, the micrometer comprises a manually rotatable knob 68 affixed to a threaded stop screw 70 which extends through a block 72 having an internally-threaded hole. Block 72 is mounted on the top surface of base plate 22 by a plurality of screws 74 and preferably the block is accurately positioned on the base plate by dowels. In addition, holes extend into the block 72 from the sides thereof for receiving nylon-tipped set screws 76 similar to the set screws 66. An index plate 78 is mounted on top of the block 72 and has a pointer arm portion 80 extending over graduation marks 82 on the knob 68. Preferably, the distance between graduations 82 is such that rotation of the knob 68 by a distance equal to that between two graduations cause 0.001 inch movement of the stop screw 70 in its axial direction. The surface 84 of the stop screw 70 is flat and parallel to the side surface of the stop bar 40.

FIG. 5 shows the drive means for rotating the cutter head assembly 32. The input drive shaft 28 is mounted in two bearings 86 and 88 which are supported by the housing parts 26a and 26b, respectively. A gear 90 is keyed to shaft 28 to rotate therewith. The shaft 28 has an enlarged shoulder 92 which spaces gear 90 from housing part 26a and a spacer 94 is provided to space gear 90 from housing part 26b. Gear 90 drives a gear 96 which is keyed to a stub shaft 98. Shaft 98 is mounted in two bearings 100 and two spacers 102 keep the gear 96 spaced from housing portions 26a and 26b.

Gear 96 drives a further gear 104 which is keyed to a stub shaft 106. Shaft 106 is mounted in bearings 108 and two spacers 110 keep the gear 104 spaced from the housing parts 26a and 26b.

Gear 104 drives a gear 112 which is keyed to the cutter assembly drive shaft 30. The drive shaft 30 is mounted in two bearings 114. A spacer 116 spaces the gear 112 from housing part 26a and a shoulder 118 on the shaft 30 spaces the gear from housing part 26b. The shoulder 118 has a groove extending around its periphery for receiving a retaining ring 120. The retaining ring prevents the shaft 30 from moving to the left as viewed in FIG. 5.

As the shaft 30 is rotated, it rotates the entire cutter head assembly 32. The cutter head assembly is best illustrated in FIGS. 1 and 3 and certain details thereof are shown in FIGS. 6-8. The cutter head assembly comprises a generally circular cutter body 122, a tool block 124, first and second tool block guide members 126 and 128, a threaded feed shaft 130, two feed gears 132 and 134, a feed shaft 135 and a star feed gear 138.

The cutter body 122 is welded to the shaft 30. The face (FIG. 3) of the cutter body is cut away to form a generally rectangular recess 150 open at the face and bottom of the cutter body. The tool block 124 is held in this recess for sliding movement in the vertical direction as viewed in FIG. 3. As shown in FIG. 8, the block guide members 126 and 128 are undercut to provide inwardly extending legs which overlap the side edges of the tool block 124. Thus, the tool block is free to slide along the face of the cutter body 122 but is retained by the inwardly extending legs of the guide members 126 and 128. The guide members 126 and 128 are attached to the face of the cutter body 122 within the recess 150 by means of four screws 136.

As viewed in FIG. 8, the tool block 124 has two upwardly extending legs which form a recess for receiving the tool bit 20. Two tapped holes are provided in one leg of tool block 124 and two set screws 140 are provided for holding the tool bit within the tool block. The cutter body 122 is recessed at 142 to permit easy access to the screws 140.

As illustrated in FIG. 7, the tool block 124 has an opening in its top surface for receiving the reduced end portion of feed shaft 130. A further hole extends from side to side through tool block 124 and a matching hole is provided in the lower portion of the feed shaft 130. A retaining pin 144 extends through the hole in feed shaft 130 and thus ties the feed shaft to the tool block. An elongated slot 146 extends from side to side through cutter body 122. An unthreaded hole 148 extends downwardly from the top of the cutter body 122, intersects the slot 146, and extends through the cutter body to the recess 150 formed in the face of the cutter body. The feed gear 132 is mounted on the feed shaft 130 and located at the region where the slot 146 intersects the hole 148. Gear 132 is internally threaded hence as the gear is rotated it bears against the cutter body 122 to push or pull feed shaft 130 along its own axis to thereby move the tool block 124 and the tool bit 20. As shown in FIG. 7, the feed shaft 130 is in its lowermost position, comparable to FIG. 1, and the phantom outline shows the position of feed shaft 130 when it is drawn to its uppermost position.

As illustrated in FIG. 6, feed gear 132 is driven by feed gear 134 which is also mounted in the slot 146. As viewed in FIG. 3, a hole is provided which extends from the top of cutter body 122 into that portion of the cutter body lying between slot 146 and recess 150. The feed shaft 135 extends through this hole and the feed gear 134 is pinned to the shaft. At the top of shaft 135, a star feed wheel 138 is pinned to the shaft.

As previously stated, as long as drive power is applied to the input shaft 28 of FIG. 5, the output shaft 30 is driven to thus rotate the entire cutter head assembly 32. This motion causes the tool bit 20 to follow a circular path. In order to finish an entire surface 18, it is necessary to move the tool bit 20 radially inwardly during the cutting operation. This inward motion of the tool bit is controlled by a feed bar 152. The feed bar is an elongated flat bar which is held against one face of housing 26 by the stop bar 40 and a feed bar clamp 154. The stop bar 40 is provided with a recess facing housing 26, the recess being sufficiently deep and wide to permit movement of the feed bar 152 in the vertical direction when the stop bar 40 is firmly attached to the housing 26 by screws 156. In like manner, feed bar clamp 154 is provided with a recess facing housing 26 which is also large enough to slidably receive the feed bar 152 when the clamp is held against the housing by screws 158. As shown in FIG. 3, the feed bar is provided with a lateral projection 160 on one side thereof which strikes the top surface of clamp 154 and limits downward travel of the feed bar. When the projection 160 is against the top of clamp 154, the lower portion of the feed bar extends downwardly into the path of star feed wheel 138. This is best shown in FIG. 1. The surface 162 of feed bar 152 is rounded so as to provide better sliding engagement and less wear on both the feed bar and the star feed wheel.

It will be obvious that as the cutter head assembly 32 is rotated, the star feed wheel 138 will engage the lower portion of feed bar 152 once each revolution of the cutter head assembly. If the star feed wheel 138 is provided with six teeth, this will result in the shaft 135 being rotated 1/6th of a revolution. This motion is transmitted through gear 134 to gear 132 which raises shaft 130 and tool block 124 (as viewed in FIG. 3) by a small fraction of an inch. Typically, each revolution of the cutter head assembly 32 may result in 0.001 inch movement of the tool bit 20. Since the cutter head assembly 32 rotates counterclockwise as viewed in FIG. 3, the shaft 130 is provided with left-hand threads engaging the internal threads of gear 132.

As shown in FIG. 3, a hole 163 is provided near the upper end of feed bar 152. A threaded matching hole is provided in housing 26 and the two holes are aligned when the projection 160 is in engagement with the top of clamp 154. A thumb screw 164 (FIG. 1) may then be inserted through hole 163 and screwed into the housing 126.

The feed bar 152 is provided with two indentations 166 as shown in FIG. 4. The stop bar 40 has a hole extending laterally therethrough and a spring loaded detent 168 is inserted in the hole to cooperate with indentations 166. When the thumb screw 164 is removed and the feed bar raised out of engagement with the star feed wheel 138, the detent mechanism 168 engages the lowermost indentation 166 to hold the feed bar in a raised position out of the path of the star feed wheel.

In order to prevent chatter and ensure a positive rotation of the shaft 135, a detent means is provided for the shaft. The cutter body 122 is provided with a slot 170 and a collar 172 is pinned to shaft 135 in the slot 170. The peripheral surface of the collar 172 is provided with a plurality of indentations, there being one indentation for each tooth on the star feed wheel 138. A hole 176 (FIG. 1) extends from the peripheral surface of cutter body 122 to the slot 170 and a spring-loaded detent mechanism 178 is provided in the hole. Each time the star wheel 138 is advanced, the mechanism 178 positively detents the collar 170, thus ensuring an equal increment of advancement of the tool bit 20 on each revolution of the cutter head assembly.

Two locating buttons 180, one of which is shown in FIG. 1, are provided to enable the user to properly locate the boring tool 10 on top of housing 12. The buttons 180 are spaced apart from each other at the same height on one side of the housing 26. When body buttons 180 touch a surface 18 of valve housing, then the boring tool 10 is in the proper rotational position on top of the housing.

As previously stated, the base plate 22 is not of uniform thickness. As illustrated in FIG. 1, the right hand portion of the plate is somewhat thicker than the left hand portion. If the top of housing 12 is considered to be horizontal, then the top of base plate 22 is inclined approximately 1° to the horizontal. The housing 26 extends perpendicular to the top of base plate 22, hence the cutter assembly drive shaft 30 is also inclined approximately 1° from the horizontal. Thus, assuming that the handwheel is not turned, the tool bit 20 rotates in a plane which is inclined 1° from the vertical, or which makes an angle of 89° with the plane of the top of the housing. The reason for this is that the valve seal ring seating surfaces 18 of conventional ball valves are inclined approximately 1° from vertical to allow assembly of the valving elements and seal rings within the chamber 16. As handwheel 56 is turned to move housing 26, the tool bit is moved parallel to its own axis of rotation, this axis being normal to the plane of the seal ring seat surface 18.

The general procedure for refinishing the seal ring seats of a ball valve with boring tool 10 is as follows. The top cover, valving elements, and seal rings are removed from the valve. The seal ring seat surfaces 18 are then cleaned and weld material added as required. Next, the boring tool 10 is placed on top of the valve housing 12 with the threaded studs on the valve housing extending upwardly through the holes 52 in the base plate 22. At this point the projection 22a on the base plate prevents any translational movement of the boring tool 10 but, because of the loose fit between the threaded studs on the housing 12 and the holes 52, a slight rotational movement of the base plate 22 can be made. Sighting downwardly through hole 24, the user checks the locating buttons 180 to make sure that both of them are abutting one of the surfaces 18. The boring tool 10 is then locked in position by placing nuts on the studs extending through holes 52 and tightening the nuts down. The user then turns handwheel 56 to move housing 26 and tool bit 20 to the left as viewed in FIG. 1. The handwheel is turned until the tool bit touches the unfinished surface 18. At this point the knob 68 of the micrometer is rotated until the surface 84 of stop screw 70 abuts stop plate 40. The user then backs off knob 68 by a number of graduations 82 equal to the depth of cut he wishes to make in the surface 18. The thumb screw 164 is removed and the feed bar 152 is raised so that its lower end 162 will not intercept the path of the star feed wheel 138. The detenting means 168 of FIG. 4 holds the feed bar in the raised position.

A power source such as a pneumatic or electric motor is connected to the input drive shaft 28 by inserting the end of the power source drive shaft into the hole 190 of the input drive shaft 28. Preferably, the hole 190 and the end of the drive shaft of the power source are square to prevent slippage. A set screw 192 is tightened to further secure the connection. When the power source is turned on, power is transmitted from the input drive shaft through the gearing shown in FIG. 4 to the cutter assembly drive shaft 30. This rotates the cutter head assembly 32 and, since the feed bar 152 is raised, the tool bit 20 moves in a circular path. As the tool bit 20 is rotated, the handwheel 56 is turned to move housing 26 and tool bit 20 into cutting engagement with the surface 18. This continues until the stop bar 40 hits the end surface 84 of stop screw 70. At this point, the tool will have cut a circular groove in the surface 18 to the depth as determined by the amount knob 68 was backed off. Next, the user turns the power source off and lowers the feed bar 152 so that its lower surface 162 is in the path of the star feed wheel 138. The thumb screw 164 is then replaced to hold the feed bar secure. Power is again applied to the drive shaft 28 and now the tool bit 20 rotates and, upon each rotation, is moved radially inwardly each time the star feed wheel 138 engages the feed bar. This operation continues until the tool bit 20 has completely cut the annular surface 18 and has progressed towards its center of rotation to the point where the tool bit is rotating opposite the opening where the channel 14 joins the chamber 16. Power is removed, and the handwheel 56 turned to back the tool bit away from the finished surface 18. The user then inspects the newly-cut surface 18 and, if he is not satisfied with the result, a new cut may be taken as described above. If the user is satisfied that the surface 18 is completely refinished, he removes the nuts holding boring tool 10 on the top of housing 12, rotates the tool 180°, and then repeats the procedure described above in order to refinish the other surface 18.

From the foregoing description, it is obvious that the present invention provides a very simple yet efficient apparatus for refinishing the seal ring seats of ball valves. It is portable and may easily be handled by one man. It is extremely compact, a preferred embodiment for refinishing 3 inch valves being less than 10 inches in height and only slightly longer in length. Its small size and light weight permit the boring tool to be used on ball valves in situ. It is not necessary to cut the valves from a line, transport them to a machine shop for refinishing, and then return them to the site of use where they must be rewelded into the line.

While a preferred embodiment of the invention has been described in specific detail, it will be obvious to those skilled in the art that various substitutions and modifications may be made in the described embodiment without departing from the spirit and scope of the invention as defined by the appended claims.

The embodiments of the invention in which an exclusive property or privilege is claimed are defined as follows:

1. A boring tool for boring and the seating surface for a seal ring in a ball valve, said ball valve having a planar top surface surrounding an opening into a valve chamber, and a seating surface for a seal ring in said chamber disposed in a plane that intersects the plane of said top surface at an angle less than 90°, said boring tool comprising:
   a base plate having a bottom surface adapted to mate with the planar top surface of a valve, said base plate having an opening therein which communicates with the chamber of a valve on which it is mounted;
   support means movably mounted on said base plate;
   an input drive shaft supported by said support means above said base plate;
   a cutter head drive shaft supported by said support means below said base plate whereby said cutter head assembly drive shaft is located in the valve chamber when the base plate is mounted on the top planar surface of a valve;

means supported by said support means for transmitting rotary motion from said input drive shaft to said cutter head assembly drive shaft;

a cutter head assembly mounted on said cutter head drive shaft and including a tool bit rotating in a circular path about an axis other than its own, said axis being normal to the seal ring seating surface; and, means for linearly moving said support means and said tool bit along an axis which is normal to the plane of the seal ring seating surface.

2. A boring tool as claimed in claim 1 wherein the means for linearly moving said tool bit comprises a manually operated feed screw mounted on said base plate and connected to said support means.

3. A boring tool as claimed in claim 2 wherein said base plate has a top surface located in a plane normal to the plane of said seal ring seating surface, and said means for linearly moving said tool bit further comprises guide means for slidably guiding said support means along the base plate top surface in response to rotation of said feed screw.

4. A boring tool as claimed in claim 1 wherein said cutter head assembly further comprises indexing means for moving said tool bit inwardly toward its axis of rotation in synchronism with the rotation of the cutter head assembly.

5. A boring tool as claimed in claim 4 wherein the means for moving said tool bit inwardly comprises:

a cutter head body mounted on said cutter head assembly drive shaft;

a slidably mounted tool block for carrying said tool bit in slidable relation to a face of said cutter head body;

a feed screw fixedly attached to said tool block;

an internally threaded gear on said feed screw which is restrained from axial movement by said cutter head body; and, means for rotating said internally threaded gear.

6. A boring tool as claimed in claim 5 wherein the means for rotating said internally threaded gear comprises:

a shaft mounted on said cutter head body;

a second gear mounted on said shaft and engaging the internally threaded gear;

a star feed wheel mounted on said shaft; and, means disposed in the path of movement of said star feed for incrementally rotating the star feed wheel once for each rotation of said tool bit.

7. A boring tool as claimed in claim 6 wherein the means for incrementally rotating said star feed wheel comprises a feed bar manually positionable in a first position whereat it engages said star feed wheel and a second position where it does not.

8. A boring tool as claimed in claim 3 and further comprising micrometer means for gauging and limiting linear movement of said tool bit, said micrometer means comprising:

a threaded shaft;

an internally threaded block mounted on said base plate, said threaded shaft extending through said threaded block toward said support means and having an end surface for limiting movement of said support means; and, a manually operable knob for rotating said threaded shaft, said knob having graduations thereon for cooperating with an index means mounted on said threaded block.

9. A boring tool for refinishing the seating surface for a seal ring in a ball valve, said boring tool comprising:

a base plate having an opening extending therethrough;

an input drive shaft;

a cutter head assembly drive shaft;

means transmitting rotary power between said input drive shaft and said cutter head assembly drive shaft;

support means movably mounted on said base plate and extending through said opening for supporting said input drive shaft, said cutter head assembly drive shaft, and said means transmitting power;

a cutter head assembly mounted on said cutter head assembly drive shaft;

a tool bit mounted on said cutter head assembly for traversing a circular path in a plane which intersects the plane of the top of the ball valve housing at an angle less than 90°; and, manual means for moving said support means along an axis normal to the plane of rotation of said tool bit.

10. A boring tool as claimed in claim 9 and further comprising means for moving said tool bit inwardly toward its axis of rotation in synchronism with the rotation of said cutter head assembly.

11. A boring tool as claimed in claim 9 wherein said angle is approximately 89°.

12. A boring tool for refinishing a seal ring seating surface of a ball valve, said ball valve having a planar top surface surrounding an opening into a valve chamber, a seal ring seating surface in said chamber and disposed in a plane that intersects the plane of said top surface at an angle less than 90°, said boring tool comprising:

a base plate having a bottom surface adapted to mate with the planar top surface of a valve with a downwardly extending portion adapted to snugly fit within the opening in said ball valve, said base plate having an opening therein which communicates with the chamber of a valve on which it is mounted;

support means movably mounted on said base plate;

an input drive shaft supported by said support means above said base plate;

a cutter head drive shaft supported by said support means below said base plate whereby said cutter head assembly drive shaft is located in the valve chamber when the base plate is mounted on the top planar surface of a valve;

means supported by said support means for transmitting rotary motion from said input drive shaft to said cutter head assembly drive shaft;

a cutter head assembly mounted on said cutter head drive shaft and including a tool bit rotating in a circular path about an axis normal to the seal ring seating surface;

feed screw means mounted on said base plate and connected to said support means for linearly moving said tool bit toward or away from the plane of the seal ring seating surface;

said base plate having a top surface which is normal to the plane of said seal ring seating surface and said support means having at least two locating buttons thereon whereby, when said base plate is resting on said planar top surface and said buttons both contact the wall of said valve chamber, said tool is properly positioned such that said tool bit will rotate in a plane parallel to the plane of said seal ring seating surface.

13. A boring tool as claimed in claim 12 wherein said top surface of said base plate is inclined one degree with respect to the top surface of said valve.

* * * * *